June 29, 1965  Z. J. LANSKY ETAL  3,191,949
SEALED JOINT AND GASKET THEREFOR
Filed Oct. 26, 1961

INVENTORS
ZDENEK J. LANSKY
BY  KURT W. LEIBFRITZ

John N. Wolfram
ATTORNEY 3,191,949
SEALED JOINT AND GASKET THEREFOR
Zdenek J. Lansky, Winnetka, and Kurt W. Leibfritz, Norridge, Ill., assignors to Parker-Hannifin Corporation, Cleveland, Ohio, a corporation of Ohio
Filed Oct. 26, 1961, Ser. No. 147,897
1 Claim. (Cl. 277—168)

This invention relates to sealed joints and to a resilient gasket for such joints.

It is an object of the invention to provide a gasket of resilient material having a thick rib section responsive to fluid pressure for increasing the pressure of the sealing contact of the same with the members being sealed and which has a relatively thin flat web section attached to the thick section for holding and locating the same, the thin section being adapted to be clamped between opposed flat faces of the members being sealed and being so thin as to substantially avoid cold flow under the clamping pressures to which it is subjected whereby loosening of the joint due to such cold flow is avoided.

It is another object to provide a multiple part gasket for sealing a multiple of unconnected openings in a part, wherein the gasket has a separate thick pressure sealed rib section for each opening and in which all of such thick rib sections are attached to a relatively thin web section adapted to be clamped between opposed flat faces of the members being sealed.

Figure 1:
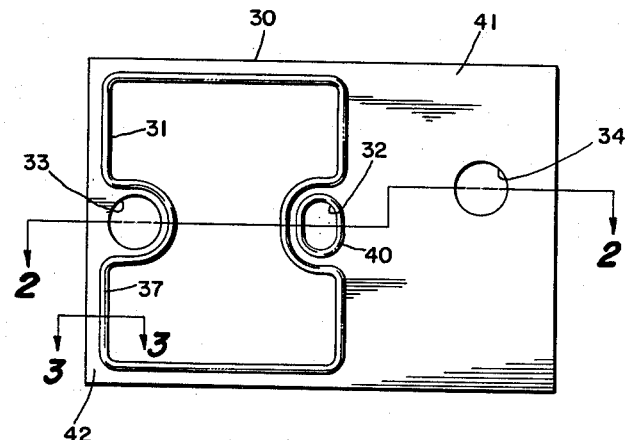
Figure 2:
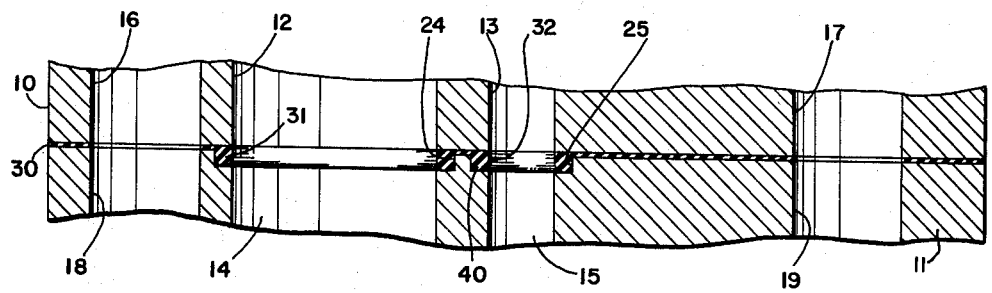
Figure 3:
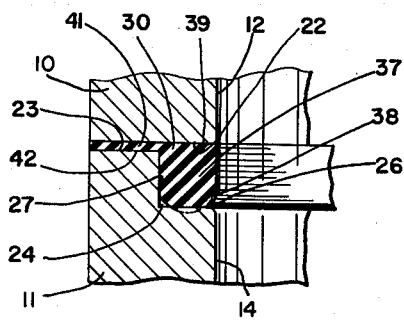

Other objects of the invention will be apparent from the following description and from the drawings in which:

FIG. 1 shows a bottom view of a typical gasket made in accordance with the present invention, FIG. 2 shows a cross section along the lines 2—2 of FIG. 1 when installed between a pair of members to be sealed, and FIG. 3 shows an enlarged fragmentary view of the gasket along the lines 3—3 of FIG. 1 when installed between a pair of members being sealed.

As shown in FIG. 2, 10 and 11 are members to be sealed, only a fragmentary portion of each being shown. These members may, for example, be parts of a valve housing. Member 10 may have openings 12 and 13 alignable respectively with openings 14 and 15 in member 11, and with the joint between such pairs of aligned openings to be sealed.

Member 10 may also have openings 16 and 17 alignable respectively with openings 18 and 19 in member 11 but with respect to which the joint therebetween need not be sealed. Thus, openings 12, 13, 14 and 15 may be for the passage of fluid and openings 16, 17, 18 and 19 may be for receiving bolts for clamping members 10 and 11 together. Thus it is obvious that it is desirable to seal openings 12 and 13 with respect to openings 14 and 15 but it is not necessary to seal openings 16 and 17 with respect to openings 18 and 19.

On member 10, openings 12, 13, 16 and 17 are surrounded by a single continuous flat face 22 while openings 14, 15 and 18, and 19 in member 11 are surrounded by a single continuous flat face 23 which is opposite portions of flat face 22. Each of the openings 14 and 15 are respectively surrounded by recesses 24, 25. Recess 24 has a bottom wall 26 preferably parallel to face 23 and a side wall 27 preferably vertical with respect to surface 23. Recess 25 has a similar bottom and side wall.

Between members 10 and 11 is a gasket 30 preferably made of resilient material such as rubber or synthetic rubber. Gasket 30 has an opening 31 corresponding with openings 12 and 14 and has an opening 32 corresponding with openings 13 and 15. The gasket also has an opening 33 corresponding with opennigs 16 and 18 and an opening 34 corresponding with openings 17 and 19.

Surrounding opening 31 and gasket has a relatively thick rib portion 37 with a rounded lower face 38 and a flat upper face 39. A similar relatively thick rib portion 40 surounds opening 32. Thick rib portions 37, 40 are spaced from each other but are both attached to a common thin web portion 41, the web having portions immediately adjacent ribs 37 and 40 on the side thereof opposite openings 31 and 32. Openings 33 and 34 are in the thin web portion as shown in FIG. 2.

As shown in the dotted lines of FIG. 3, rib 37 is made of an initial thickness slightly greater than the depth of recess 24 so that the rib will be somewhat compressed between bottom surface 26 of the recess and flat surface 22 when members 10 and 11 are brought together with surface 22 in contact with upper face 39 of the gasket and with surface 23 in contact with lower surface 42 of web 41. The upper surface of web 41 is co-planar with the upper surfaces of ribs 37 and 40.

Web 41 is of a thickness such that it can withstand high clamping pressures between surfaces 22, 42 without appreciable cold flow which would cause the web to become thinner by permanent set with resultant loss of clamping pressure and loosening of the joint. It has been found, for example, that with a synthetic rubber of 70 durometer hardness a web thickness of .015" or less gives good results in this respect.

The outer wall of rib 37 is initially substantially in contact with side wall 27 of recess 24 and a similar situation exists with respect to the outer sidewall of rib 40 and the side wall of groove 25.

In the assembled joint, when openings 12, 14 contain fluid under pressure, the fluid presses rib 37 tightly against recess side wall 27 to establish sealing contact therebetween. By this action, rib 37 tends to become thinner and to expand in an endwise direction with the result that upper surface 39 is forced more tightly against surface 22 and the lower end is forced more tightly against recess bottom 26 to thus increase the sealing contact pressure at these points. A like situation obtains with respect to rib 40 and its recess.

Because of the tight clamping of the parallel upper and lower surfaces of web 41 between parallel surfaces 23, 39 and because web 41 is so thin that it does not cold flow appreciable between such flat surfaces, there is no appreciable flow of material from ribs 37, 40 into the space between surfaces 23, 39 due to internal fluid pressure.

In the form of the invention shown, both members 10 and 11 have aligned openings for receiving fluid under pressure, with the joint between the openings to be sealed by the gasket. In another form of the invention, member 10 may take the form of a closure plate with openings 12 and 13 omitted, or member 11 may be the closure plate with recesses 24, 25 retained but openings 14, 15 omitted. Various other modifications may be made without departing from the scope of the invention as defined by the claim.

We claim:

An integral gasket comprising a member of resilient deformable rubber-like material having an opening therethrough, a rib of substantial thickness surrounding said opening, a thin web of approximately .015" thickness and of approximately 70 durometer so as to be substantially resistant to cold flow when clamped between flat surfaces surrounding said rib and integrally connected thereto at one end thereof with an end surface of the rib being coplanar with said one end of the rib, the other end of the rib being rounded for making initial line contact with a surface to be sealed.

References Cited by the Examiner

UNITED STATES PATENTS

| | | | |
|---|---|---|---|
| 2,102,673 | 12/37 | Brown | 277—225 |
| 2,395,243 | 2/46 | Aukers | 277—235 X |
| 2,679,241 | 5/54 | Dickson | 277—235 X |
| 2,709,021 | 5/55 | Jones | 22—46 X |
| 2,867,463 | 1/59 | Snider | 277—225 |
| 2,886,205 | 5/59 | Gerry | 220—46 X |

FOREIGN PATENTS

| | | |
|---|---|---|
| 801,127 | 7/36 | France. |
| 687,955 | 2/53 | Great Britain. |

EDWARD V. BENHAM, *Primary Examiner.*

WALTER A. SCHEEL, *Examiner.*